US008874024B2

(12) United States Patent
Argott

(10) Patent No.: US 8,874,024 B2
(45) Date of Patent: Oct. 28, 2014

(54) METHODS, SYSTEMS, AND COMPUTER PROGRAM PRODUCTS FOR EVENT ATTENDANCE PROCESSING AND ATTENDEE IDENTIFICATION AND RELATED DEVICES

(75) Inventor: Lauren Argott, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1873 days.

(21) Appl. No.: 11/950,868

(22) Filed: Dec. 5, 2007

(65) Prior Publication Data
US 2009/0148827 A1    Jun. 11, 2009

(51) Int. Cl.
G09B 19/00    (2006.01)
G09B 7/02    (2006.01)

(52) U.S. Cl.
CPC ........................ *G09B 7/02* (2013.01)
USPC .......................................................... 434/351

(58) Field of Classification Search
USPC .......................................................... 434/351
See application file for complete search history.

(56) References Cited

U.S. PATENT DOCUMENTS

| 2003/0137424 A1* | 7/2003 | Gehlot et al. ............... 340/573.4 |
| 2006/0022796 A1* | 2/2006 | Striemer ........................ 340/7.2 |
| 2006/0035205 A1  | 2/2006 | Dobson et al. |
| 2008/0280279 A1* | 11/2008 | Jang et al. ..................... 434/308 |

FOREIGN PATENT DOCUMENTS

GB    2384065 A  *  7/2003
WO    WO 2007075076 A1  *  7/2007

* cited by examiner

*Primary Examiner* — Sam Yao
*Assistant Examiner* — Robert P Bullington
(74) *Attorney, Agent, or Firm* — Myers Bigel Sibley & Sajovec

(57) ABSTRACT

A method of tracking attendance of an event includes detecting a presence of at least one mobile attendee device. The mobile attendee device includes personal identification information stored therein for an attendee associated therewith who is registered for the event. An ad hoc wireless data connection is established with the mobile attendee device responsive to detection thereof. An identification request is transmitted to the mobile attendee device via the ad hoc wireless data connection, and the personal identification information for the attendee is received from the mobile attendee device via the ad hoc wireless data connection. The received identification information is displayed on an administrator device. Related systems, devices, and computer program products are also discussed.

18 Claims, 7 Drawing Sheets

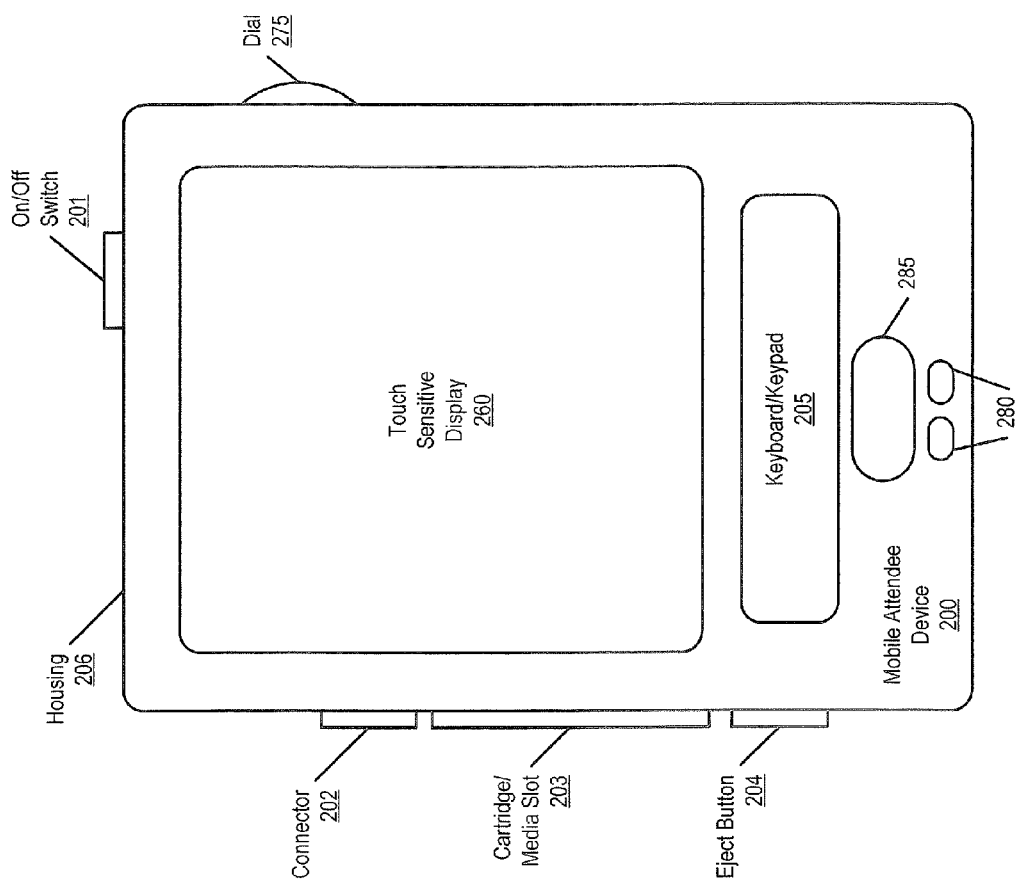
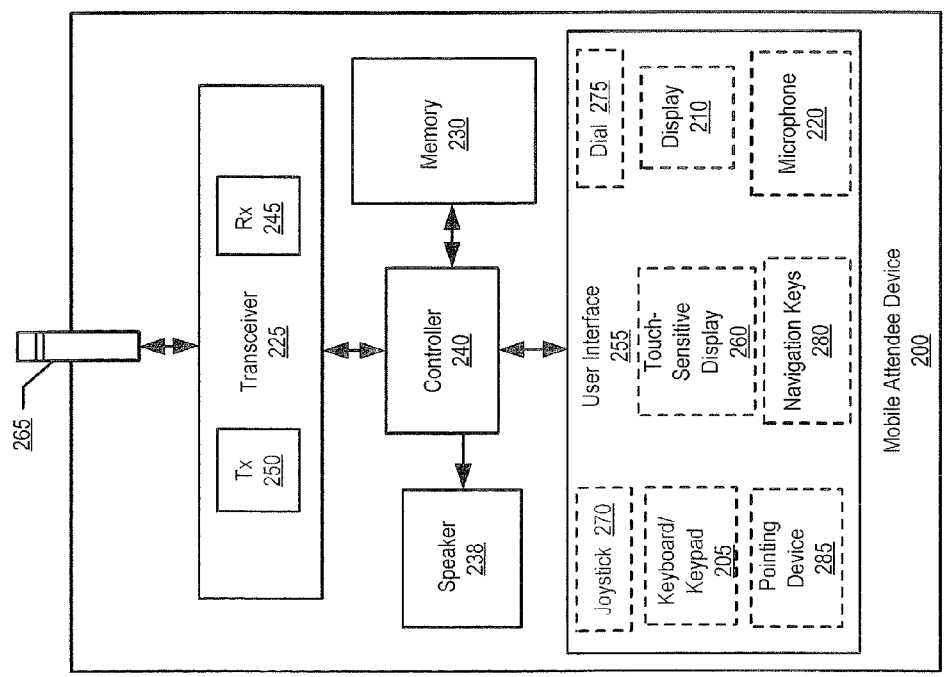

| Id | Student name | School year | SID Field 1 | SID Field 2 | SID Field 3 |
|---|---|---|---|---|---|
|  |  |  |  |  |  |
|  |  |  |  |  |  |

Student ID Table 601

| Id | School District | School Name | SNField 1 | SN Field 2 | SN Field 3 |
|---|---|---|---|---|---|
|  |  |  |  |  |  |

School Name Table 602

| Id | Class Name | Class Time | Class Room | Class ID | Teacher Name | Teacher Id | Initial download |
|---|---|---|---|---|---|---|---|
|  |  |  |  |  |  |  |  |
|  |  |  |  |  |  |  |  |

Class Schedule Table 603

| Id | Photo | Photo ID field 1 | Photo ID field 2 | Photo ID field 3 |
|---|---|---|---|---|
|  |  |  |  |  |
|  |  |  |  |  |

Student Photo ID Table 604

| Id | School Name | School Map | SM Field 1 | SM Field 2 | SM Field 3 |
|---|---|---|---|---|---|
|  |  |  |  |  |  |
|  |  |  |  |  |  |

School Map Table 605

| Id | Teacher Id | Teacher Name | Class Seat | Field 2 | Field 3 | Field 4 |
|---|---|---|---|---|---|---|
|  |  |  |  |  |  |  |

Teacher's Information Table 606
(one per teacher, set up during Initial Class Day Program)

FIG. 6

METHODS, SYSTEMS, AND COMPUTER PROGRAM PRODUCTS FOR EVENT ATTENDANCE PROCESSING AND ATTENDEE IDENTIFICATION AND RELATED DEVICES

BACKGROUND

The present invention relates generally to the field of communications networks, and more particularly, to methods of providing identification information over communications networks and related devices.

For many educational and other institutions, tracking attendance can be a time-consuming and tedious chore. For example, in a school setting, a teacher may take attendance manually, by asking each student to state "here" when his or her name is called, or by visually scanning the classroom to determine which students are present. The teacher may then write down the information and forward it to the school administration, often by hand. If a student enters the class late, after attendance has been taken, the teacher must take note of that fact, and interrupt teaching to update his or her attendance records.

The consequences of poor attendance recordkeeping can be significant for public schools, administrators, and school districts, among other organizations. For instance, average daily attendance (ADA) may be an important statistic used to determine school funding. Since school funding may be based on ADA figures, schools may lose money every time a student is absent. As such, when poor or inconsistent attendance tracking wrongly indicates that a present student is absent, the school may needlessly lose funding.

Moreover, in light of recent events, safety has become another issue facing educational and other institutions. For example, due to rising crime rates, students may be required to carry identification to even be permitted on school grounds. As such, identifying of students who do not belong in a school or even a particular classroom may be an important step in maintaining student safety.

Another problem that plagues public education systems and other organizations is the lack of funding for resources, such as textbooks. Textbooks may be a fundamental component of current public education systems, and as such, may be required for every student. Often, several books may be assigned to each student for each class. Additional and/or supplemental books may also be required during different portions of the school year, for example, for special projects. In addition, textbooks may be frequently revised by publishers, which may require replacement of entire supplies of books in the school systems in which such books are used. Students may also physically struggle with the problem of transporting textbooks from one class to another, as verified by recent studies illustrating the physical strain being placed on students' backs. Furthermore, the schools themselves may impose limitations on the types of backpacks that students may carry, for example, due to rising crime rates and aforementioned concerns over student safety.

SUMMARY

According to some embodiments, a method of tracking attendance of an event includes detecting a presence of at least one mobile attendee device. The mobile attendee device includes personal identification information stored therein for an attendee associated therewith who is registered for the event. An ad hoc wireless data connection is established with the mobile attendee device responsive to detection thereof. An identification request is transmitted to the mobile attendee device via the ad hoc wireless data connection, and the personal identification information for the attendee is received from the mobile attendee device via the ad hoc wireless data connection. The received identification information is displayed on an administrator device.

In some embodiments, the mobile attendee device may be one of a plurality of mobile attendee devices associated with respective ones of a plurality of attendees. The plurality of mobile attendee devices may include respective personal identification information for respective ones of the plurality of attendees. Respective presences of the plurality of mobile attendee devices may be detected, and respective ad hoc wireless data connections may be established with the plurality of mobile attendee devices responsive to detection thereof. The identification request may be transmitted to the plurality of mobile attendee devices via the respective ad hoc wireless connections, and the respective personal identification information may be received from the plurality of mobile attendee devices for the attendees associated therewith via the respective ad hoc wireless connections. A visual attendance roster may be generated based on the respective personal identification information for the plurality of attendees, and the visual attendance roster may be displayed on the administrator device.

In other embodiments, respective relative spatial relationships between the administrator device and the plurality of mobile attendee devices may be determined based on respective signals received therefrom. For example, the respective signals from the plurality of mobile attendee devices may identify respective seating positions currently associated therewith. The seating positions may be associated with known physical locations in a room. The visual roster may thereby be generated based on the determined spatial relationships.

In some embodiments, the received personal identification information may be compared with expected identification information for registered attendees of the event. An absence of a registered attendee and/or a presence of an unregistered attendee may be determined based on the comparison. In addition, the notification may be transmitted to an electronic device associated with a contact person for the absent registered attendee responsive to determining the absence thereof.

In other embodiments, the event may be a class meeting in a school. The received personal identification information for the plurality of attendees may be forwarded from the administrator device to a master administrator device for the school. The master administrator device may be configured to receive information from a plurality of administrator devices. The master investor device may thereby determine a total number of currently present attendees in the school based on the received identification information from the plurality of administrator devices.

In some embodiments, a subset of the visual attendance roster including personal identification information for ones of the plurality of attendees may be selectively displayed on the administrator device responsive to selection thereof from the displayed visual attendance roster.

In other embodiments, detecting, establishing, transmitting, and receiving may be performed at a first time. A presence of at least one additional mobile attendee device may be detected at a second time after the first time, and a wireless data connection may be established with the at least one additional mobile attendee device responsive to detection thereof. A second identification request may be transmitted to the at least one additional mobile attendee device via the wireless data connection, and personal identification information may be received from the at least one additional mobile attendee device via the wireless data connection. Tardy ones of the plurality of attendees may be determined based on the personal identification information received in response to the first identification request at the first time and the personal identification information received in response to the second identification request at the second time.

In some embodiments, a name, photographic image, social security number, school year, class schedule, and/or current expected location for the attendee associated with the mobile attendee device may be displayed on the administrator device.

In other embodiments, the mobile attendee device may be one of a plurality of mobile attendee devices associated with respective ones of a plurality of attendees who are registered for the event. Respective presences of the plurality of mobile attendee devices may detected, and a listing of the plurality of mobile attendee devices may be displayed responsive to detection thereof. The ad hoc wireless data connection may be selectively established with at least one of the plurality of mobile attendee devices responsive to a selection thereof from the displayed listing.

In some embodiments, a current location of the mobile attendee device may be compared with an expected location for the attendee associated therewith indicated by the received personal identification information. A warning signal may be transmitted to the mobile attendee device via the ad hoc wireless data connection when the current location does not match the expected location.

In other embodiments, the identification request may be received from the administrator device via the ad hoc wireless data connection. The personal identification information for the attendee may be transmitted to the administrator device via the ad hoc wireless data connection responsive to receiving the identification request at the mobile attendee device.

According to other embodiments, a method of operating a mobile attendee device associated with an attendee registered for an event includes detecting a presence of an administrator device associated with the event. An ad hoc wireless data connection is established with the administrator device responsive to detection thereof. An identification request is received from the administrator device via the ad hoc wireless data connection, and personal identification information for the attendee is transmitted to the administrator device via the ad hoc wireless data connection responsive to receiving the identification request.

In some embodiments, the detected administrator device may be authenticated prior to establishing the ad hoc wireless data connection therewith.

In other embodiments, a tag associated with a seating position proximate the mobile attendee device may be read, and a signal may be transmitted to the administrator device via the ad hoc wireless data connection identifying the seating position currently proximate thereto. The seating position may be associated with a known physical location in a room.

In some embodiments, a warning signal may be received from the administrator device via the ad hoc wireless data connection when a current location of the mobile attendee device does not match an expected location for the attendee associated with the mobile attendee device, as indicated by the personal identification information transmitted therefrom. A warning message may be displayed on the mobile attendee device responsive to receiving the warning signal.

According to still other embodiments, a system for tracking attendance of an event includes at least one mobile attendee device and an administrator device. The at least one mobile attendee device includes personal identification information stored therein for an attendee associated therewith who is registered for the event. The administrator device is configured to detect a presence of the at least one mobile attendee device, establish an ad hoc wireless data connection with the at least one mobile attendee device responsive to detection thereof, transmit an identification request to the at least one mobile attendee device via the ad hoc wireless data connection, receive the personal identification information for the attendee from the at least one mobile attendee device via the ad hoc wireless data connection, and display the received identification information on the administrator device.

In some embodiments, the at least one mobile attendee device may include a plurality of mobile attendee devices associated with respective ones of a plurality of attendees and including respective personal identification information therefor. The administrator device may be further configured to generate and display a visual attendance roster based on the respective personal identification information for the plurality of attendees.

Other methods, systems, devices, and/or computer program products according to other embodiments will become apparent to one with skill in the art upon review of the following drawings and detailed description. It is intended that all such additional methods, systems, devices, and/or computer program products be included within this description, be within the scope of the present invention, and be protected by the accompanying claims.

BRIEF DESCRIPTION OF THE DRAWINGS

FIGS. 2A and 2B are block diagrams illustrating a mobile attendee device configured to be used with communication systems for event attendance tracking and attendee identification according to some exemplary embodiments.

FIG. 6 is a diagram illustrating an exemplary database tables stored in mobile attendee devices according to some exemplary embodiments.

DETAILED DESCRIPTION

Figure 1:
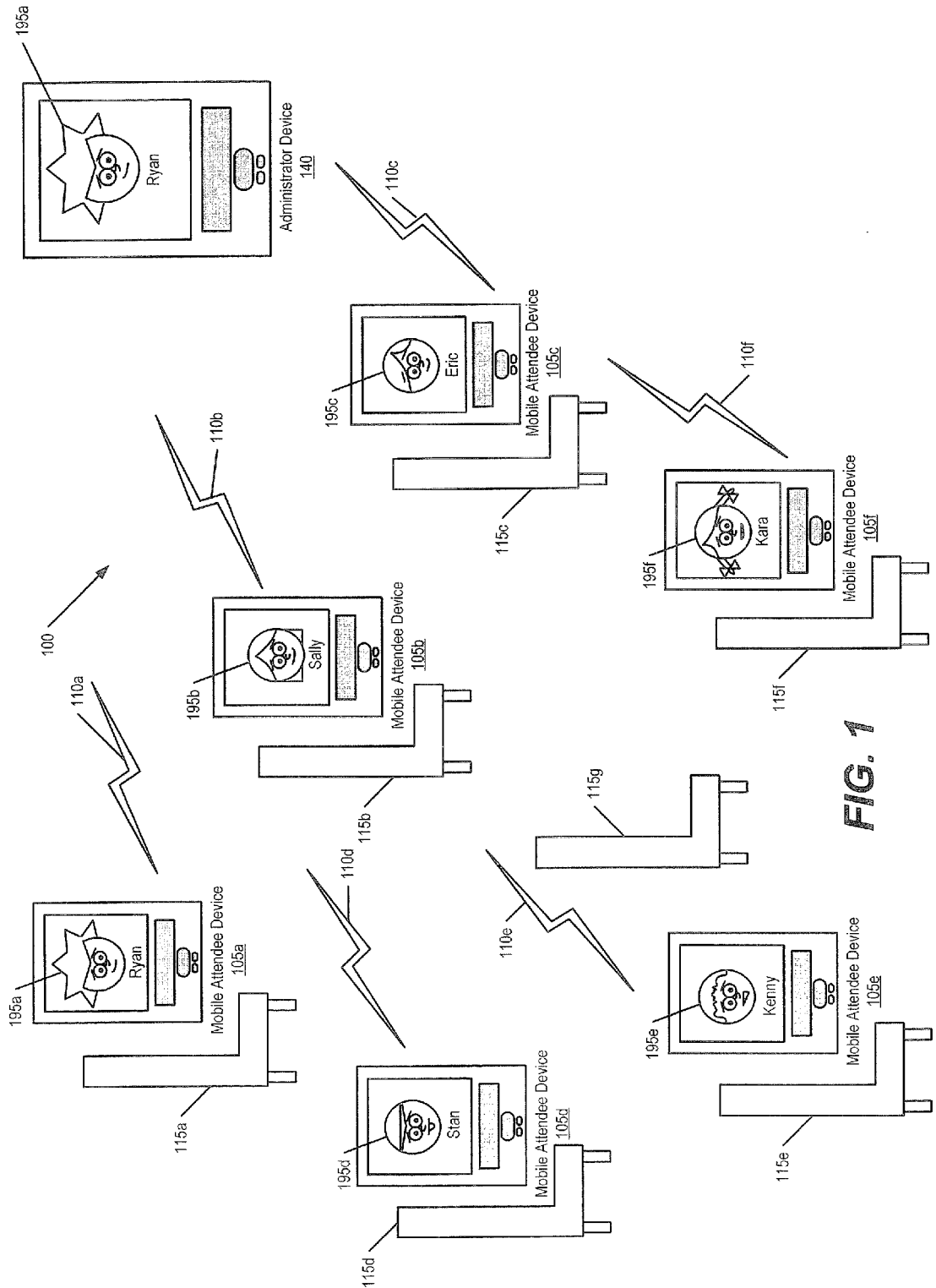
FIG. 1 is a block diagram illustrating a communication system for event attendance tracking and attendee identification and related devices according to some exemplary embodiments.

Specific exemplary embodiments will now be described with reference to the accompanying drawings. Embodiments may be implemented in many different forms, and the embodiments described herein should not be construed as limiting. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first mobile electronic device could be termed a second mobile electronic device, and, similarly, a second mobile electronic device could be termed a first mobile electronic device without departing from the teachings of the disclosure.

Exemplary embodiments are described hereinafter with reference to flowchart and/or block diagram illustrations of systems, methods, and computer program products in accordance with some embodiments. These flowchart and/or block diagrams further illustrate exemplary operations of the system and device architectures of FIGS. 1 to 3. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to some embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

As used herein, the term "mobile attendee device" may include any wired and/or wireless portable device that is capable of storing and transmitting personal identification information about the attendee assigned thereto, and may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and/or a notebook or laptop computer that includes a wireless local area network transceiver.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

FIG. 1 illustrates an event attendance tracking and attendee identification system and related devices and methods according to some embodiments. The event may be, for example, a conference for members of a particular profession, a meeting for members of a particular organization, and/or a class meeting for students in a school and/or university. Referring now to FIG. 1, the system 100 includes a plurality of mobile attendee devices 105*a*-105*f* and an administrator device 140. The mobile attendee devices 105*a*-105*f* may be portable and/or handheld electronic devices assigned to each attendee who is registered for the event and may be configured to store and transmit personal identification information about the attendee assigned thereto to the administrator device 140. For instance, in some embodiments, the mobile attendee devices 105*a*-105*f* may each include the functionality of the Neutron Reader devices described in greater detail below. The administrator device 140 may be a portable and/or stationary electronic device, such as a personal computer, configured to communicate with the mobile attendee devices 105a-105f over a wireless interface and display the received personal identification information for the corresponding attendees.

More particularly, the mobile attendee devices 105a-105f each include a wireless local area network interface transceiver that is configured to support formation of one or more ad hoc wireless data connections between the respective mobile attendee devices 105a-105f and a similar wireless local area network interface transceiver included in the administrator device 140 according to a localized wireless connection protocol. The localized wireless connection protocol may be provided, for example, according to a Wi-Fi standard and/or a Bluetooth standard. In addition, one or more of the mobile attendee devices 105a-105f may include an infrared (IR) transceiver configured to establish the ad hoc wireless data connections using infrared couplings. The ad hoc wireless data connections 110a-110f allow wireless transmission and receipt of data between the administrator device 140 and respective ones of the mobile attendee devices 105a-105f.

The administrator device 140 may be configured to detect, discover, and/or authenticate one or more mobile attendee devices 105a-105f within a predetermined distance or transmission range of its wireless local area network transceiver, for instance, based on respective signals received from the mobile attendee devices 105a-105f, using discovery techniques familiar to those skilled in the art. In some embodiments, to reduce signal interference that may occur during data transmission between ones of the mobile attendee devices 105a-105f and the administrator device 140, the ad hoc wireless data connections 110a-110f may be established using different frequencies and/or spread-spectrum techniques, such as spread-spectrum frequency hopping. Such techniques are well-known in the art and will not be discussed further herein.

Still referring to FIG. 1, the administrator device 140 is configured to establish respective ad hoc wireless data connections with one or more of the mobile attendee devices 105a-105f responsive to detection thereof. In some embodiments, the administrator device 140 may be configured to automatically establish respective ad hoc wireless data connections with all detected mobile attendee devices 105a-105f upon detection thereof. In other embodiments, the administrator device 140 may be configured to selectively establish a respective wireless data connection with one or more of the detected mobile attendee devices 105a-105f responsive to a selection thereof on the administrator device 140. For example, the administrator device 140 may be configured to display a listing of the detected mobile attendee devices 105a-105f, and may be configured to selectively establish a wireless data connection with a particular one of the mobile attendee devices 105a-105f responsive to a user selection thereof from the displayed listing.

The mobile attendee devices 105a-105f each include personal identification information 195a-195f for a respective attendee stored therein, for instance, in an internal and/or removable memory device. Such a memory device may include as a hard disk drive, an optical storage medium, such as a compact disc (CD), and/or other electronic storage medium, such as a flash memory device and/or a cartridge-based storage medium. The personal identification information 195a-195f may include a name, picture/photographic image, social security number, event registration status, schedule, and/or current expected location for the assigned attendee. The personal identification information 195a-195f may further include additional information depending on the particular type of event. For example, where the event is a class meeting for students in a school, the personal identification information stored in each of the mobile attendee devices may further include the school year, class schedule, teachers, and or other related information for the assigned student.

As such, the administrator device 140 is configured to transmit an identification request to one or more of the detected mobile attendee devices 105a-105f via the respective ad hoc wireless data connections 110a-110f. For example, referring to FIG. 1, the identification request may instruct a mobile attendee device 105a to transmit the personal identification information 195a stored therein for the assigned attendee to the administrator device 140 via the ad hoc wireless data connection 110a. The administrator device 140 may thereby receive and display the personal identification information 195a for the attendee assigned to the mobile attendee device 105a. Accordingly, the administrator device 140 may be used to identify a particular attendee of the event responsive to detection of his assigned mobile attendee device 105a. The administrator device 140 may thereby direct the attendee to his scheduled location based on the displayed personal identification information 195a. For example, in a school setting, an administrator using a handheld administrator device 140 may identify a student in a hallway during a scheduled class time based on the personal identification information 195a received from the student's assigned mobile attendee device 105a, and may direct the student to the appropriate classroom based on the displayed scheduling information for the student.

In some embodiments, the administrator device 140 may be configured to receive respective personal identification information 195a-195f from the plurality of mobile attendee devices 105a-105f via the respective ad hoc wireless data connections 110a-110f. For example, the administrator device 140 may sequentially establish the ad hoc wireless data connections 110a-110f with each of the mobile attendee devices 105a-105f, and may thereby sequentially receive the personal identification information 195a-195f therefrom. Additionally or alternatively, known contention management techniques may be used where responses are received from multiple mobile attendee devices simultaneously. Accordingly, the administrator device 140 may be used to track attendance of the event based on a comparison of the received personal identification information 195a-195f with expected identification information for the event.

Figure 3:
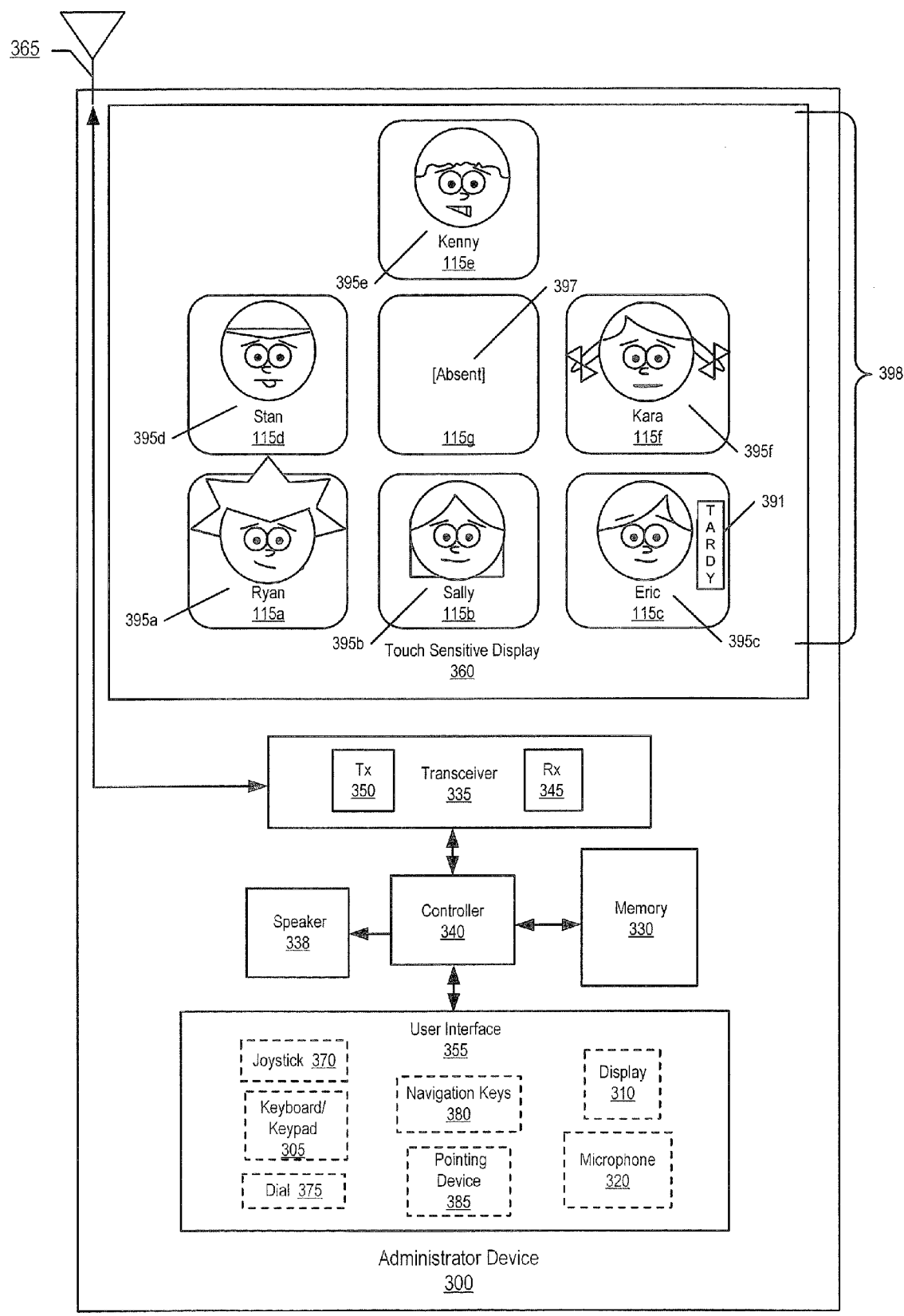
FIG. 3 is a block diagram illustrating an administrator device configured to be used with communication systems for event attendance tracking and attendee identification according to some exemplary embodiments.

The administrator device 140 may be further configured to generate and display a visual attendance roster based on the respective personal identification information 195a-195f, as illustrated in greater detail in FIG. 3. For example, in a classroom setting, the administrator device 140 may display the visual attendance roster to indicate an absence of one or more students who are registered for the class (and/or a presence of one or more students who are not registered for a class) based on a comparison of the received personal identification information 195a-195f from the mobile attendee devices 105a-105f with an expected class roster stored in the administrator device 140. The administrator device 140 may also be configured to selectively display personal identification information for a particular one of the attendees responsive to selection thereof on the visual attendance roster. In addition, responsive to determining the absence of a particular attendee, the administrator device 140 may be configured to transmit a notification to electronic device associated with a contact person for the attendee, such as a parent, guardian, and/or emergency contact.

The administrator device 140 may also be configured to determine relative spatial relationships between the administrator device 140 and one or more of the detected mobile attendee devices 105a-105f. For example, the personal identification information 195a-195f transmitted from each of the mobile attendee devices 105a-105f may identify the respective seating positions 115a-115f of the attendees associated therewith. More particularly, each of the seating positions 115a-115g in a classroom may include a radio frequency identification (RFID) tag, which may be read by a proximate one of the mobile attendee devices 105a-105f and transmitted to the administrator device 140 along with the respective personal identification information 195a-195f. The RFID tag and physical location associated with each seating position 115a-115g may be known to the administrator device 140, and, as such, the administrator device 140 may identify the respective seating positions 115a-115f associated with each of the detected mobile at attendee devices 105a-105f based on the personal identification information received therefrom. In other embodiments, the administrator device 140 may be configured to determine the relative spatial relationships of the detected mobile attendee devices 105a-105f based on respective signals provided there from, for example, using a received signal strength of the signals, GPS data, and/or using a directional antenna array.

Accordingly, the administrator device 140 may use the determined spatial relationships for the mobile attendee devices 105a-105f to arrange the personal identification information 195a-195f displayed in the visual attendee roster according to the position of the administrator device 140 in the classroom relative to the positions of the mobile attendee devices 105a-105f. For example, based on the organization of the personal identification information 195a-195f in the visual attendance roster, an instructor using the administrator device 140 may refer to the visual attendance roster to assist the instructor in learning the names and faces of the students in the classroom.

Although FIG. 1 illustrates an exemplary event attendance tracking and attendee identification system according to some embodiments, it will be understood that some embodiments are not limited to such configuration, but are intended to encompass any configuration capable of carrying out the operations described herein. For example, although illustrated as a mobile device in FIG. 1, the administrator device 140 may, in some embodiments, be a fixed and/or stationary device, such as a personal computer.

FIG. 2A illustrates a mobile attendee device 200 configured to be used with communication systems for event attendance tracking and attendee identification according to some embodiments. In some embodiments, the mobile attendee device 200 may correspond to one of the mobile attendee devices 105a-105f of FIG. 1. Moreover, in some embodiments, a mobile attendee device 200 may be a cellular telephone and/or personal data assistant (PDA) including software configured to perform the operations described herein. Referring now to FIG. 2A, the mobile attendee device 200 includes a wireless transceiver 235 coupled to an antenna 265, a controller 240, a memory 230, a speaker 238, and a user interface 255. The transceiver 235 includes a transmitter 250 and a receiver 245. The transceiver 235 includes a wireless local area network interface transceiver configured to establish an ad hoc wireless connection to an administrator device, such as the administrator device 140 of FIG. 1, via the antenna 265. The transceiver 235 is configured to establish the ad hoc wireless data connection according to a localized wireless connection protocol, such as a Bluetooth, Wi-Fi, and/or IR connection protocol.

The memory 230 may represent a hierarchy of memory that may include volatile and/or non-volatile memory, such as removable flash, magnetic, and/or optical rewritable non-volatile memory. The memory 230 is configured to store personal identification information associated with an attendee to whom the mobile attendee device 200 is assigned. For example, the personal identification information may include the attendee's name, address, picture/photographic image, social security number, event registration information and schedule, and/or other personal data for the attendee as defined by an event administrator. For instance, in a mobile attendee device used in a school system, the personal identification information stored in the memory 230 may include a student's name, address, photo, school year, class schedule and registration, and/or other student data, as described in greater below with reference to FIG. 6.

The controller 240 is coupled to the transceiver 235, the memory 230, the speaker 238, and the user interface 255. The controller 240 may be, for example, a commercially available or custom microprocessor that is configured to coordinate and manage operations of the transceiver 235, the memory 230, the speaker 238, and the user interface 255. The user interface 255 includes a microphone 220, a display 210, a joystick 270, a keyboard/keypad 205, a touch sensitive display 260, a dial 275, navigation keys 280, and/or a pointing device 285 (such as a mouse, trackball, touchpad, etc.). However, additional and/or fewer elements of the user interface 255 may actually be provided depending on the particular functionalities offered by the mobile attendee device 200.

FIG. 2B illustrates an external view of the mobile attendee device 200 of FIG. 2A according to some embodiments, also referred to herein as a Neutron Reader. As shown in FIG. 2B, the mobile attendee device 200 includes a housing 206 including the touch sensitive display 260, the keyboard/keypad 205, the mouse pad/pointing device 285, navigation keys 280, and a dial 275. The mobile attendee device 200 further includes a power switch 201, a connector 202, such as a universal serial bus (USB) connector, a cartridge/media slot 203 configured to accept event-related content stored on a cartridge, CD, DVD, and/or other removable storage media, and an eject button 204 used to eject the media that is currently loaded in the cartridge/media slot 203.

Referring now to FIGS. 2A and 2B, the controller 240 is configured to establish an ad hoc wireless data connection with the administrator device via the transceiver 235 according to the localized wireless connection protocol. For example, the controller 240 may be configured to establish the ad hoc wireless data connection responsive to detection of the mobile attendee device 200 by the administrator device using well-known discovery techniques. As such, the controller 240 is configured to receive an identification request from the administrator device via the ad hoc wireless data connection, and in response, is configured to transmit the personal identification information for the attendee assigned to the mobile attendee device 200 to the administrator device via the ad hoc wireless data connection. For example, in some embodiments, the controller 240 may be configured to transmit all of the personal identification information stored in the memory 230 responsive to the received identification request. However, in other embodiments, the controller 240 may be configured to transmit only the particular items of personal identification information specified in the received identification request. The controller 240 may also be configured to authenticate the administrator device prior to transmitting the personal identification information and/or prior to establishing the ad hoc wireless connection, to ensure that the personal identification information stored in the memory 230 is not shared with unauthorized parties. Such authentication techniques are well-known in the art and will not be discussed further herein. Thus, the controller 240 may provide the administrator device with personal identification information for the attendee assigned the mobile attendee device 200, which may be used by the administrator device to assist and/or direct the attendee to a particular location.

Also, in response to transmitting the personal identification information, the controller 240 may be configured to receive a warning signal from the administrator device indicating that the current location of the mobile attendee device 200 does not match the expected location for the attendee, for example, based on event scheduling data for the attendee included in the transmitted personal identification information. The controller 240 may further display a warning message to the attendee via the touch sensitive display 260 in response to receiving the warning signal from the administrator device.

In addition, the controller 240 may be configured to assist the administrator device in determining a relative spatial relationship between the mobile attendee device 200 and the administrator device, for example, by transmitting a signal to the administrator device via the transceiver 235. For example, where each seating position in a classroom includes an identifying tag, such as an RFID tag, the controller 240 may be configured to read an identifying tag associated with a seating position that is proximate to the mobile attendee device 200 and transmit the tag information to the administrator device via the ad hoc wireless data connection. In some embodiments, the controller 240 may be configured to transmit the tag information as part of the personal identification information for the attendee in response to the identification request from the administrator device. In other embodiments, the controller 240 may be configured to transmit the tag information indicating the seating position currently associated with the mobile attendee device 200 as a separate signal.

Although FIGS. 2A and 2B illustrate an exemplary mobile attendee device that may be used in communication systems for event attendance tracking and attendee identification according to some embodiments, it will be understood that embodiments are not limited to such a configuration, but are intended to encompass any configuration capable of carrying out the operations described herein. For example, although the memory 230 is illustrated as a separate component from the controller 240, the memory 230 or portions thereof may be considered as part of the controller 240. More generally, while particular functionalities are shown in particular blocks by way of illustration, functionalities of different blocks and/or portions thereof may be combined, divided, and/or eliminated.

FIG. 3 illustrates an administrator device 300 configured to be used with communication systems for event attendance tracking and attendee identification according to some embodiments. In some embodiments, the administrator device 300 may correspond to the administrator device 140 of FIG. 1. Moreover, in some embodiments, the administrator device 300 may be similar to the mobile attendee device 200 of FIG. 2, but may include different software that is configured to perform the operations described in detail below. Referring now to FIG. 3, the administrator device 300 includes a wireless transceiver 335 coupled to an antenna 365, a controller 340, a memory 330, a speaker 338, and a user interface 355. Depending on the functionalities offered by the administrator device 300, the user interface 355 may include a microphone 320, a display 310, a joystick 370, a keyboard/keypad 305, a touch sensitive display 360, a dial 375, navigation keys 380, and/or a pointing device 385 (such as a mouse, trackball, touchpad, etc.). However, additional and/or fewer elements of the user interface 355 may actually be provided.

The transceiver 335 includes a transmitter 350 and a receiver 345. The transceiver 335 includes a wireless local area network interface transceiver configured to establish an ad hoc wireless connection with one or more mobile attendee devices, such as the mobile attendee device 200 of FIGS. 2A-2B, via the antenna 365. The transceiver 335 is configured to establish the ad hoc wireless data connections according to a localized wireless connection protocol, such as a Bluetooth, Wi-Fi, and/or IR connection protocol. While a single antenna 365 is illustrated in FIG. 3 by way of example, multiple antennas may be provided.

Still referring to FIG. 3, the memory 330 may be represent a hierarchy of memory that may include volatile and/or non-volatile memory, such as removable flash, magnetic, and/or optical rewritable non-volatile memory. The memory 330 is configured to store personal identification information for one or more attendees, which may be respectively received from their assigned mobile attendee devices via the transceiver 335. The controller 340 is coupled to the transceiver 335, the memory 330, the speaker 338, and the user interface 355. The controller 340 may be, for example, a commercially available or custom microprocessor that is configured to coordinate and manage operations of the transceiver 335, the memory 330, the speaker 338, and the user interface 355.

The controller 340 is configured to detect and/or discover the local presence of one or more mobile attendee devices within a predetermined distance or transmission range of the transceiver 335, for instance, based on respective signals received from the mobile attendee devices using known discovery techniques. The controller 340 is further configured wirelessly transmit an identification request to one or more of the mobile attendee devices via the transceiver 335 responsive to detection thereof. The identification request may instruct a receiving mobile attendee device to wirelessly transmit personal identification information for an assigned attendee to the administrator device 300. The personal identification information may include the attendee's name, address, picture/photographic image, social security number, event registration status, schedule, current expected location, and/or additional information, depending on the particular type of event. As such, the controller 340 may wirelessly receive the personal identification information via the transceiver 335, and may display the received personal identification information via a display, such as the touch sensitive display 360. For example, the controller 340 may selectively establish an ad hoc wireless data connection with a particular one of the detected mobile attendee devices, such as the mobile attendee device 105a of FIG. 1, and may transmit an identification request to the mobile attendee device 105a via the ad hoc wireless data connection. In response, the controller 340 may receive personal identification information 195a (including a picture and name) for the attendee assigned to mobile attendee device 105a via the ad hoc wireless data connection, and may display the received personal identification information on the touch sensitive display 360.

Accordingly, the administrator device 300 may be used to identify a particular attendee of an event based on the personal identification information received from the attendee's assigned mobile attendee device, which may be used to further assist the attendee during the course of the event. For example, in a school setting, an administrator using a handheld administrator device 300 may identify a student in a hallway during a scheduled class time based on the personal identification information received from the mobile attendee device assigned to the student, and may be alerted that this student is skipping class based on the scheduling information for the student received from the student's mobile attendee device. The administrator may thereby direct the student to the appropriate classroom based on the received scheduling information displayed on the administrator device 300. In some embodiments, the controller 340 may be configured to transmit a warning signal to the mobile attendee device via the ad hoc wireless data connection when the current location of the mobile attendee device does not match the expected location of the attendee, as indicated by the received personal identification information. For instance, in the above example, the administrator device 300 may transmit a warning signal to the mobile attendee device assigned to the student in the hallway, which may display a warning message advising the student to return to the classroom indicated by the received scheduling information for the student.

In addition, the administrator device 300 may be used to track attendance of an event by wirelessly transmitting identification requests to multiple mobile attendee devices and wirelessly receiving respective personal identification information therefrom. More particularly, the controller 300 is configured to establish respective ad hoc wireless data connections with the detected mobile attendee devices according to the localized wireless connection protocol, and is configured to transmit an identification request to the mobile attendee devices via the respective ad hoc wireless data connections. In response, the controller 340 is configured to receive the respective personal identification information from the mobile attendee devices via the respective ad hoc wireless data connections. For example, the controller 340 may sequentially establish ad hoc wireless data connections with each of the detected mobile attendee devices, and may thereby sequentially receive the personal identification information therefrom. The controller 340 is also configured to compare the personal identification information received from each of the detected mobile attendee devices with expected identification information for the attendees scheduled to attend the event, and as such, can determine a presence of one or more unregistered attendees and/or an absence of one or more registered attendees. For instance, in a classroom setting, the controller 340 may compare the names of the attendees received from the respective mobile attendee devices with a class roster, and may determine the presence or absence of particular students based on the comparison. The controller 340 may thereby be configured to display a list of registered attendees who are absent (and/or unregistered attendees who are present) via the display 360.

Likewise, the controller 340 may be configured to identify attendees who are late or tardy for the scheduled event by wirelessly transmitting identification requests to the detected mobile attendee devices at different times. For instance, in a classroom setting, the controller 340 may transmit a first identification request at the beginning of class to the detected mobile attendee devices, and in response, may receive respective personal identification information from each of the mobile attendee devices at that time. The controller 340 may later transmit a second identification request to the mobile attendee devices at a predetermined time after the beginning of class (e.g., 10 minutes after the scheduled start time for the class), and may similarly receive respective personal identification information from each of the detected mobile attendee devices in response to the second identification request. The controller 340 may thereby compare the personal identification information received in response to the first identification request at the beginning of class with the personal identification information received in response to the later-transmitted second identification request to determine which of the attendees were not present at the beginning of class.

The controller 340 may be further configured to forward the received personal identification information to one or more other administrator devices. For example, where the administrator device 300 is associated with a teacher of a particular class, the controller 340 can transmit a notification to other administrator devices indicating the absence of a particular student from class, including a photographic image of the missing student. As such, other teachers and/or administration officials who encounter the missing student may identify the student based on the photographic image displayed on their respective devices. In addition, responsive to determining the absence of a particular attendee, the controller 340 may be configured to transmit a notification to an electronic device associated with a contact person for the attendee. For instance, in a school setting, upon determining that a currently-absent student has more than a predetermined number of absences, the controller 340 may transmit an e-mail or text message to a parent, guardian, or truancy officer indicating the student's repeated absences. In addition, where the administrator device 300 is associated with a particular class, the controller 340 may be configured to transmit attendance information for that class to a master administrator device in the school's office, which may be configured to receive personal identification information from other administrator devices in each of the school's classrooms. The master administrator device may be configured to aggregate the received personal identification information from each of the administrator devices and thereby determine a total number of present students at any given time, to provide an up-to-the-minute census function.

Still referring to FIG. 3, the controller 340 is also configured to generate and display a visual attendance roster 398 on the touch sensitive display 360 based on the received personal identification from each of the mobile attendee devices. As shown in FIG. 3, the visual attendance roster 398 presents at least some of the received personal identification information as respective icons 395a-395f arranged in a matrix format. In particular, the visual attendance roster 398 displays the names and faces for the attendees assigned to the respective mobile attendee devices 105a-105f of FIG. 1 based on the personal identification information received therefrom. As such, an instructor using the administrator device 300 in a classroom setting may refer to the names and faces displayed in the visual attendance roster 398 to assist the instructor in learning the names and faces of the students in her class. Additional attendee information for one or more attendees received from the mobile attendee devices 105a-105f may also be displayed responsive to receiving a selection of one or more of the icons 395a-395f on the touch sensitive display 360, for example, using a stylus. In addition, a subset of the received personal identification information may be selectively displayed responsive to a selection of one or more of the icons 395a-395f by row, column, alphabetically, and/or in other combinations, for instance, using a stylus to point to one or more of the icons 395a-395f on the touch-sensitive display 360. The visual attendance roster 398 may also identify one or more absent attendees 397 based on the comparison of the received personal identification information from the detected mobile attendee devices 105a-105f and expected identification information for the attendees scheduled to attend the event. Likewise, the visual attendance roster 398 may identify a late or tardy attendee by providing an indication 391 thereof alongside the attendee's icon 395c on the display 360.

In addition, the visual attendance roster 398 may be configured to display relative spatial relationships between the administrator device 300 and one more of the detected mobile attendee devices. More particularly, the controller 340 may be configured to determine the respective spatial relationships based on respective signals received from the mobile attendee devices 105a-105f, and may generate the visual roster 398 based on the determined to spatial relationships. For example as illustrated in FIG. 1, each of the seating positions 115a-115f in the classroom may include a respective tag, such as an RFID tag, which may be read by a proximate one of the mobile attendee devices 105a-105f and transmitted to the administrator device 300 along with the respective personal identification information. The RFID tag and physical location associated with each of the seating positions 115a-115g may be previously stored in the memory 330, and as such, the controller 340 may be configured to identify current seating position associated with each of the detected mobile attendee devices based on the personal identification information received therefrom. In other embodiments, the controller 340 may be configured to determine the relative spatial relationships of the detected mobile attendee devices based on a received signal strength of the signals from the mobile attendee devices 105a-105f and/or using a directional antenna array, such as the antenna 365. Accordingly, the controller 340 may generate the visual attendance roster 398 in a layout that mimics the arrangement of the seating positions 115a-115g in the classroom, which may aid an administrator or other user of the administrator device 300 in learning the names and faces of the attendees in conjunction with their seating assignments.

Although FIG. 3 illustrates an exemplary administrator device that may be used in communication systems for event attendance tracking and attendee identification according to some embodiments, it will be understood that embodiments are not limited to such a configuration, but are intended to encompass any configuration capable of carrying out the operations described herein. For example, although illustrated as a mobile or portable terminal, the administrator device 300 may be provided as a fixed and/or stationary terminal according to some embodiments. In addition, the controller 340 may be configured to perform one or more of the above-described functions via one or more fixed wireless transceivers at the event location, which may be configured to wirelessly relay the personal identification information from one or more mobile attendee devices to the administrator device 300. More generally, while particular functionalities are shown in particular blocks by way of illustration, functionalities of different blocks and/or portions thereof may be combined, divided, and/or eliminated.

Figures 4A, 4B:
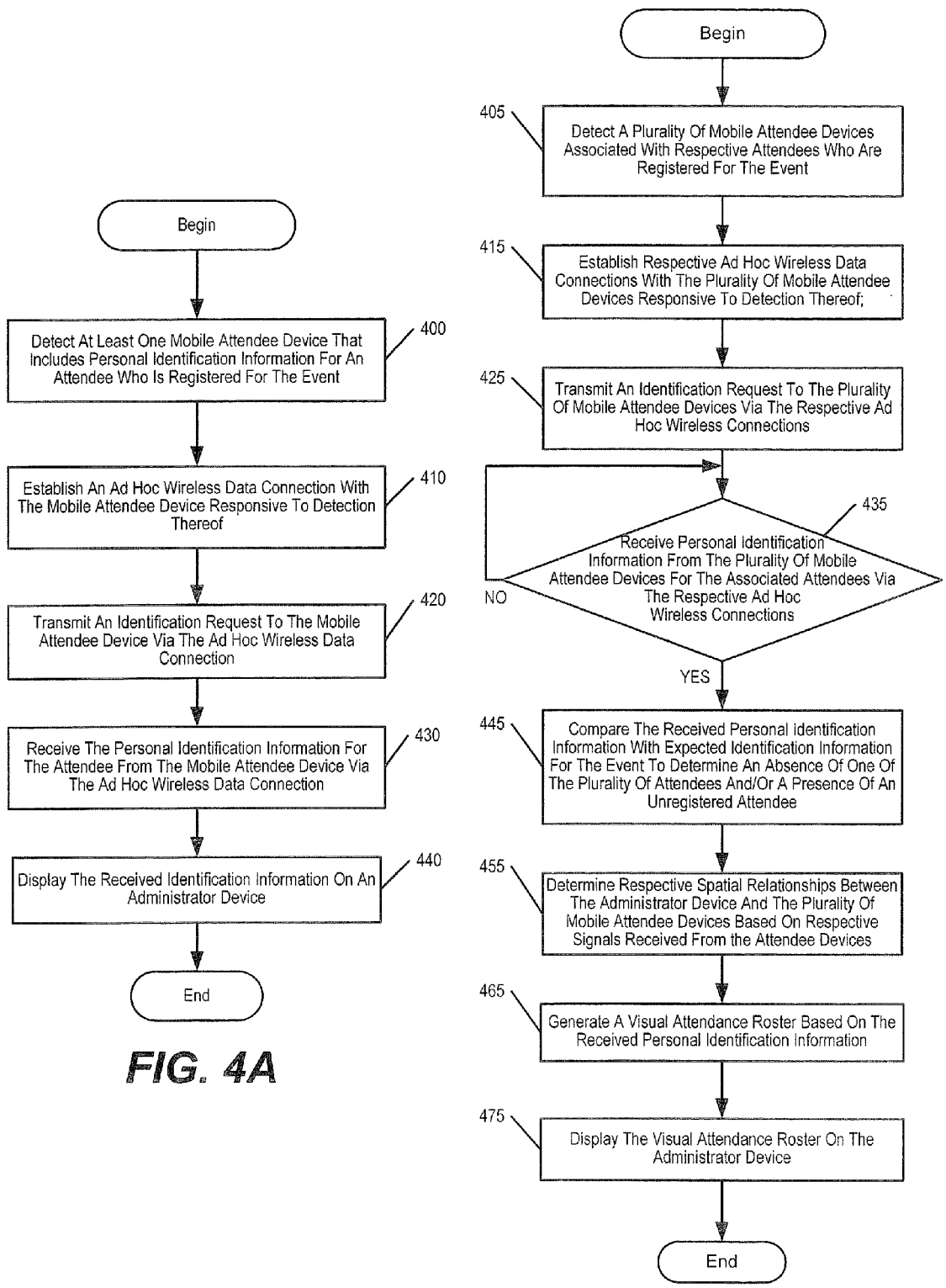
FIG. 4 is a flowchart illustrating exemplary operations that may be performed by an administrator device in a communication system for event attendance tracking and attendee identification according to some exemplary embodiments.

FIGS. 4A and 4B are flowcharts illustrating exemplary operations according to some embodiments that may be performed by an administrator device, such as the administrator device 300 of FIG. 3, for event attendance tracking and attendee identification. Referring now to FIG. 4A, operations begin at Block 400 when at least one mobile attendee device associated with an attendee who is registered for the event is detected. For example, the mobile attendee device may be detected within a predetermined range of the administrator device based on a signal or beacon provided by the mobile attendee device, using known discovery techniques. The mobile attendee device includes personal identification information for the assigned attendee stored in its memory. The personal identification may include, for example, the attendee's name, social security number, photographic image, event registration and/or scheduling information, and/or other information that may be relevant based on the type of event.

At Block 410, an ad hoc wireless data connection is established with the mobile attendee device responsive to detection thereof. The ad hoc wireless data connection is established according to a localized wireless connection protocol, such as a Bluetooth, Wi-Fi, and/or IR connection protocol. An identification request is transmitted to the mobile attendee device via the ad hoc wireless data connection at Block 420. The identification request may indicate one or more items of personal identification information that is requested by the administrator device. At Block 430, the requested personal identification information for the attendee is received from the attendee device via the ad hoc wireless data connection. The received personal identification information is thereby displayed on the administrator device at Block 440. As such, a particular attendee of the event may be identified and/or assisted based on the personal identification information received from her assigned mobile attendee device. For example, in a conference setting, each attendee of the conference may be assigned a mobile attendee device, and the conference administration officials may direct an attendee to a particular area of the conference based on scheduling information received from the mobile attendee device assigned to the attendee.

FIG. 4B illustrates more detailed operations for event attendance tracking and attendee identification according to some embodiments. Referring now to FIG. 4B, operations begin at Block 405 when a plurality of mobile attendee devices are detected. Each of the detected mobile attendee devices is associated with an attendee who is registered for the event. At Block 415, respective ad hoc wireless data connections are established with the detected mobile attendee devices. For example, in some embodiments, the ad hoc wireless data connections may be sequentially established with each detected mobile attendee device, to avoid signal interference during data transmission between the administrator device and ones of the mobile attendee devices. However, in other embodiments, the ad hoc wireless data connections may be established using different frequencies and/or spread-spectrum techniques, such as spread-spectrum frequency hopping, to reduce the occurrence of signal interference during data transmission between multiple mobile attendee devices and the administrator device.

Still referring to FIG. 4B, the identification request is transmitted to the mobile attendee devices via the respective ad hoc wireless data connections at Block 425. In response to the transmitted identification quest, respective personal identification information is received from the mobile attendee devices via the respective ad hoc wireless data connections at Block 435. As noted above, the personal identification information may include the name, picture, social security number, event registration and/or scheduling information, and/or other relevant information for each of the attendees associated with the detected mobile attendee devices. The received personal identification information from the detected mobile attendee devices is compared with the expected identification information for the event to determine an absence of one or more registered attendees and/or a presence of one or more unregistered attendees at Block 445. In some embodiments, the determined attendance information may also be forwarded to one or more other administrator devices, such as an administrator device in a central office of a school system.

In addition, respective spatial relationships between the administrator device and the detected mobile attendee devices are determined at Block 455. For example, the relative spatial relationships may be determined based on the received signal strength of respective signals provided by each of the detected mobile attendee devices, and/or based on seating position information included in the personal identification information received from the detected mobile attendee devices. Based on the determined spatial relationships and the comparison with the expected identification information, a visual attendance roster is generated at Block 465 and displayed on the administrator device at Block 475. The visual attendance roster provides a graphical representation of the current seating positions of the attendees associated with each of the detected mobile attendee devices relative to the position of the administrator device, and may also identify the absence of registered attendees and/or present unregistered attendees. An administrator or other user of the administrator device may thereby refer to the visual attendance roster to learn the names, faces, and/or seating assignments of the attendees of the event.

Figure 5:
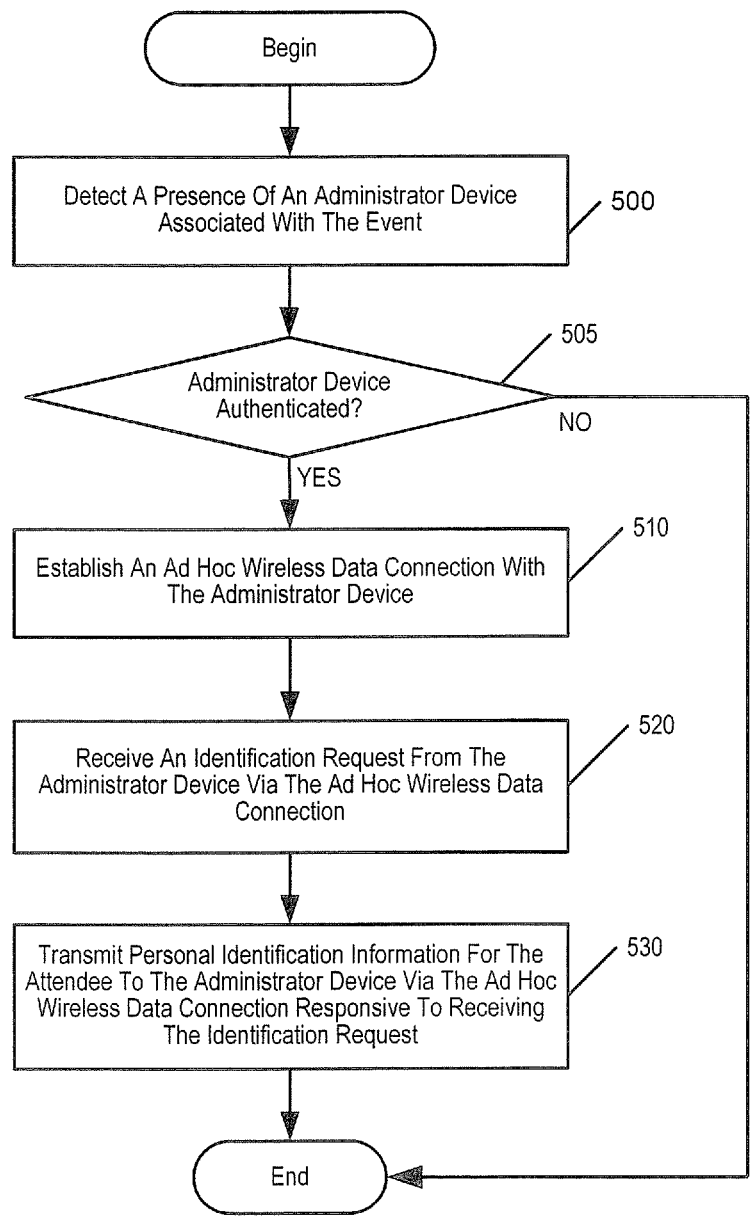
FIG. 5 is a flowchart illustrating exemplary operations that may be performed by a mobile attendee device in a communication system for event attendance tracking and attendee identification according to some exemplary embodiments.

FIG. 5 is a flowchart illustrating exemplary operations according to some embodiments that may be performed by a mobile attendee device, such as the mobile attendee device 200 of FIGS. 2A and 2B, that is associated with an attendee registered for an event. Referring now to FIG. 5, operations begin when the presence of an administrator device associated with the event is detected at Block 500. The detected administrator device is authenticated at Block 505 prior to providing the administrator device with access to the mobile attendee device. As such, if authentication fails at Block 505, operations end to ensure that the personal identification information stored in the mobile attendee device is not shared with unauthorized parties. However, if the administrator device is successfully authenticated at Block 505, an ad hoc wireless data connection is established with the detected administrator device at block 510. The ad hoc wireless data connection is established according to a localized wireless connection protocol, such as a Bluetooth, IR, and/or Wi-Fi protocol.

At Block 520, an identification request is received from the administrator device via the ad hoc wireless data connection. As noted above, the identification request may indicate particular personal identification information about the attendee associated with the mobile attendee device that is requested by the administrator device. In response, the requested personal identification information is transmitted to the administrator device via the ad hoc wireless data connection at Block 530. For example, in some embodiments, all of the personal identification information stored in the mobile attendee device may be transmitted to the administrator device responsive to the received identification request. However, in other embodiments, only the particular the items of personal identification information specified in the received identification request may be transmitted to the administrator. Thus, personal identification information for the attendee may be provided to an administrator device associated with the event, which may be used to direct the attendee to a particular event location and/or otherwise assist the attendee in conjunction with the event.

The flowcharts of FIGS. 4A-4B and 5 illustrate the architecture, functionality, and operations of some embodiments of communication system for event attendance tracking and attendee identification according to some embodiments. In this regard, each Block may represent a module, segment, or a portion of code, which may comprise one or more executable instruction for implementing the specified logical functions. It should also be noted that in other implementations, the functions noted in the Blocks may occur out of the order noted in FIGS. 4A-4B and 5. For example, two Blocks shown in succession may, in fact, be executed substantially concurrently, or the Blocks may be sometimes executed in the reverse order, depending on the functionality involved.

Further embodiments will now be described with reference to the functionality of a mobile attendee device configured to be used in a school system, such as the mobile attendee device 200 of FIG. 2B, also referred to herein as a Neutron Reader. The Neutron Reader is a durable, handheld and/or portable electronic device that students may utilize to read and view electronic representations of textbooks stored on cartridges and/or other removable storage media, such as CDs. The size of the Neutron Reader may be similar to that of a typical textbook, e.g., 9.5"×11"×1.5". The Neutron Reader may be assigned or issued to a student at a particular level in the educational process (e.g. in the $6^{th}$ grade), and would be utilized by that student through the student's high school graduation. In some embodiments, there may also be versions of the Neutron Reader configured for use by younger students (e.g., in grades 1-5).

As the textbooks are stored on electronic storage media, such as cartridges, additional textbooks and/or changes to textbooks may be provided via software updates, which may reduce the financial burden on the school districts. In addition, the book cartridges for the Neutron Reader may be reusable, or may be relatively inexpensive and disposable. The cartridges may also include electronic representations of additional reading materials, which may be required by certain teachers in addition the content provided in the regular textbooks. The Neutron Reader may be further configured to translate textbooks into various languages.

The Neutron Reader utilizes a wireless local area network transceiver and a localized wireless connection protocol (lwcp) to establish an ad hoc wireless data connection and send information to an instructor or administrator terminal, such as the administrator device 300 of FIG. 3, when requested. The Neutron Reader also includes accompanying software to utilize the lwcp in both the classroom as well as in an administrator's office.

The Neutron Reader presents a relatively simple interface for students to open and begin reading their textbooks. More particularly, the Neutron Reader includes a touch sensitive display configured to accept electronic interaction via a stylus or finger, a roller wheel/dial, a mouse pad/pointing device, and navigation (i.e., page-up, page-down, up, down, left, and right, etc.) keys. The interface allows the students to move from one page to another, focus on an area of a page, and/or focus on a section of a page. The stylus may be used to write notes on the touch sensitive display, and the written notes can be captured and stored in the memory of the Neutron Reader. Accordingly, notes can be viewed and/or printed out with the underlying text accompanying the notes. This feature may be especially beneficial in math classes, as the students may work directly on the pages of the problems, save their work directly on the Neutron Reader, and submit their work to the administrator device via the ad hoc wireless data connection.

The Neutron Reader is also configured to allow students to complete homework tasks on the Neutron Reader itself. The Neutron Reader has the capability to print and save to an external source, in order to provide a variety of means to submit homework. In particular, the Neutron Reader may be configured to allow a student to capture and store notes written on a displayed page with the underlying text, print the stored notes, write, edit, save, and/or otherwise modify a displayed document, download pages, accept writing and/or other input and save such inputs, and/or send data to external source in an encrypted manner. Also, for students who may have access to computers and laptops in their homes, the connectivity hardware and/or software for the Neutron Reader may be compatible with Windows, Mac, and/or other commonly used operating systems. Thus, a student may be able to port his work from the Neutron Reader onto his personal computer (e.g., via a USB interface) and vice versa, which may allow greater flexibility. Additionally, an encryption methodology may be utilized by the Neutron Reader to reduce the possibility of students homework being misrepresented. For example, each Neutron Reader may include an encryption program configured to encrypt completed homework files prior to transmission thereof, to ensure that each homework file that is turned in is unique and to reduce the incidence of plagiarism. As such, students may be able to do their homework on their Neutron Reader, which may reduce the financial strain on lower income parents and/or schools to provide computers for this purpose.

Each Neutron Reader may be loaded with default personal identification information for each student for initial distribution. For example, a setup wizard application program may be used to set Lip a Neutron Reader with initial information for the new student, such as the student's name, school year/grade, class schedule (including teacher's names), map of the school, and/or any additional fields that may be defined by the school district.

FIG. 6 illustrates a plurality of database tables including examples of such default personal identification information. For instance, each Neutron Reader may be configured to store a plurality of tables 601-606, including information such as the name of the student to whom it is assigned, the student's school district, and/or an image/photo of the student. In particular, as shown in FIG. 6, the Neutron Reader may be configured to store a Student ID table 601 including the student's name, school year, and additional student identification information, such as a social security number; a School Name table 602 including the school district, school name, and other school information; a Class Schedule table 603 for the student including a listing of course names, times, classrooms, and teachers; a Student Photo ID table 604 including photographic image data for the student and accompanying identification information; a School Map table 605 including the school name and corresponding map data; and a Teacher Information table 606 including identification information for each of the student's teachers. However, fewer and/or additional information may be stored in each Neutron Reader.

In addition, a previously used Neutron Reader may be reassigned to a new student in the school system, for example, upon the graduation of the student to which the Neutron Reader was previously assigned. As such, a wizard program may be used to facilitate deletion of information from the Neutron Reader to cleanly reassign it to a new student at any grade level and/or load the Neutron Reader with new student information.

Figure 7:
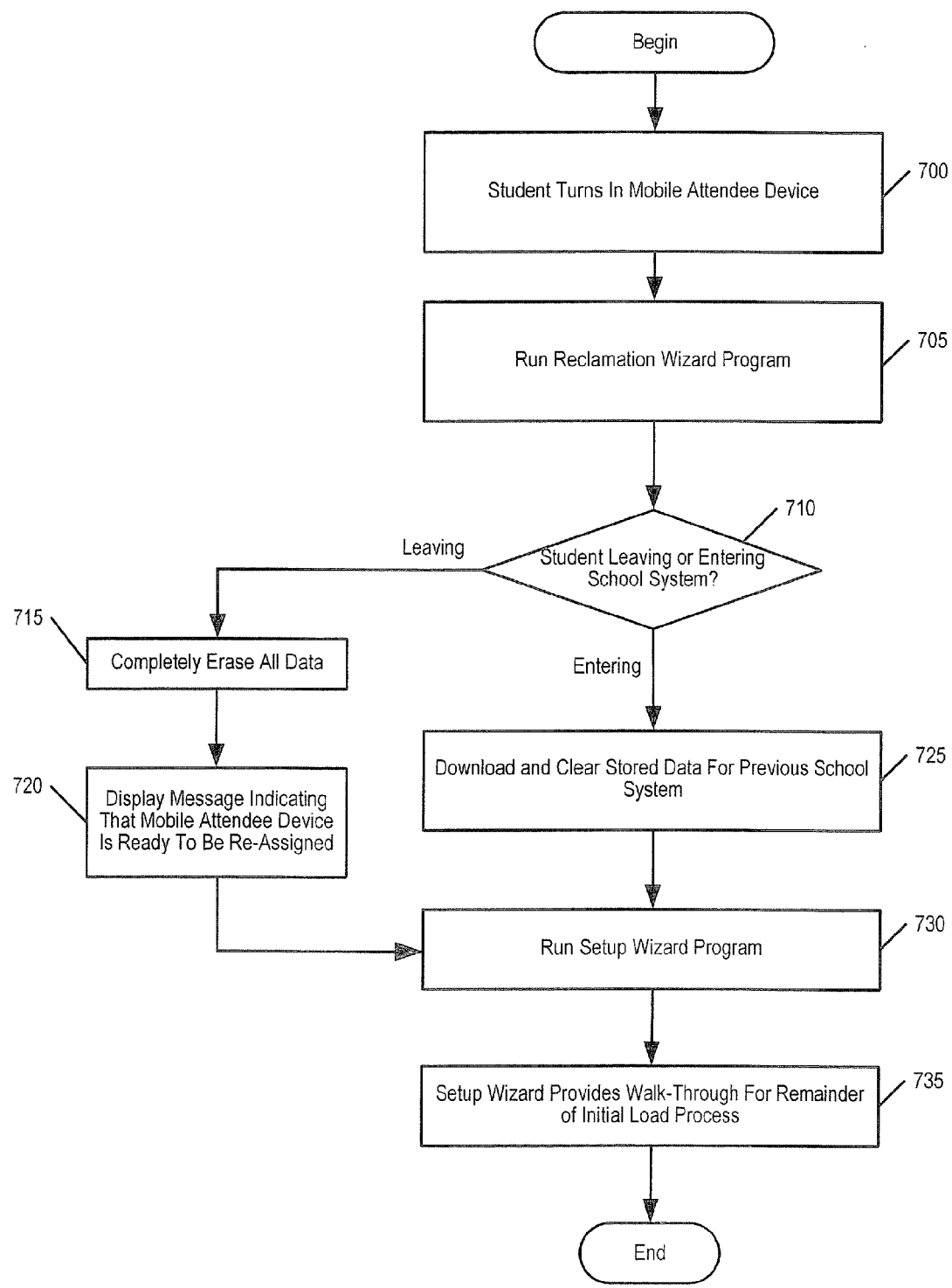
FIG. 7 is a flowchart illustrating exemplary operations for reclaiming a mobile attendee device according to some exemplary embodiments.

FIG. 7 is a flowchart illustrating such a reclamation process according to some embodiments. Referring now to FIG. 7, a student provides his assigned Neutron Reader to a school official at Block 700, and the reclamation wizard program is run on the Neutron Reader at Block 705, for example, by a school administrator. At Block 710, it is determined whether the student currently assigned to the Neutron Reader is leaving or entering the school. For example, the student may be leaving the school system due to graduation from high school, or may be transferring into the school from another school within the district. If it is determined that the student is leaving the school at Block 710, the data stored in the Neutron Reader is completely erased at Block 715, and a message is displayed at Block 720 indicating that the Neutron Reader is ready to be re-assigned to a new student. In contrast, if it is determined at Block 710 that the student is entering the present school as a transfer student from a previous school in the school system, the schedule, homework files, and/or other data stored on the Neutron Reader that is related to the previous school is downloaded and cleared at Block 725. The setup wizard program is run on the Neutron Reader at Block 730 to load the Neutron Reader with initial personal identification information for the present school, such as the information illustrated in FIG. 6. In some embodiments, the setup wizard may be automatically launched responsive to clearing the data previously stored on the Neutron Reader. Accordingly, at Block 735, the setup wizard walks the school administrator through the remainder of the initial load process for the transfer student, as described above, to prepare the Neutron Reader for use in the present school.

Still further embodiments will now be described with reference to the functionality of an administrator device configured to be used with Neutron Readers in a school setting, such as the administrator device 300 of FIG. 3. The administrator device may include software configured to queue a plurality of educational content (such as particular portions of different textbooks based on the day's lesson plans), and to send a synchronization command to display the educational content to all Neutron Readers in a classroom. In response to receiving the synchronization command, the Neutron Readers assigned to students who are registered for the course identified by the synchronization command are configured to "turn" to the page(s) currently displayed on the administrator device. Thus, the administrator device may command all of the Neutron Readers in the classroom to display a particular section of a textbook. For example, in Math class, the administrator device may narrow the focus of the students in the classroom to a single area or problem on a page.

The administrator device may also be configured to transmit a lock command to "lock" the Neutron Readers to display only a single page or set of pages, thereby preventing students from viewing unauthorized content, for example, during exams. The administrator device may be further configured to provide an audible, visible, and/or tactile alert signal if a Neutron Reader is not displaying the correct page in response to the synchronization command and/or is displaying unauthorized content. As such, the administrator device may request and receive data from that Neutron Reader indicating the content that is currently being displayed at any given time via the ad hoc wireless data connection. Such a feature may be used to prevent students from viewing non-educational content and/or otherwise abusing the functionality of the Neutron Reader. Moreover, the administrator device may use such a feature to determine if a student has fallen behind and/or is struggling with solving a previously presented problem.

The administrator device may be further configured to transmit homework assignments for the night, the week, or any given time period to all of the Neutron Readers in the classroom via the respective ad hoc wireless data connections. The administrator device may also include an application or program configured to collect completed homework files from the Neutron Readers the next day. For example, the administrator device may be configured to request and receive completed homework files from all of the Neutron Readers in a classroom responsive to depression of a single button on the administrator device to simplify the process. The collection program may also link the received homework files with the appropriate Neutron Readers based on the identification information stored in the Neutron Reader from which it was received. Completed homework files may also be turned in more traditional ways, such as by saving to an external key drive, printing to an external printer, and/or e-mailing the files to the administrator device. For work performed outside of a Neutron Reader, such as on a student's personal computer, the administrator device may associate the completed homework file with the Neutron Reader assigned to the student from whom it was received. The administrator device may thereby generate and display a roster, such as the visual attendance roster 398 of FIG. 3, indicating which Neutron Readers had turned in homework files and which Neutron Readers had not. The administrator device may also be configured to transmit a particular completed homework file to one or more Neutron Readers to be displayed and discussed in class in real-time.

In addition, the administrator device may be configured to transmit an identification request to each Neutron Reader in the classroom (via a respective ad hoc wireless data connection) requesting personal identification information from each Neutron Reader according to the localized wireless connection protocol. The requested identification information may include the name of the student assigned to the Neutron Reader, other identification information for the student (such as Social Security Number), the current school district, a picture or photographic image of the student, the student's current grade/level in school, the student's class schedule, and/or other data that may be defined by the instructor. The requested identification information may also include the student's current seating position in the classroom, for example, as identified from a RFID tag included in each seating position.

As such, the administrator device may quickly determine class attendance based on a comparison of the received identification information from the students' Neutron Readers with the expected class roster. In particular, the administrator device may automatically identify which students are missing when identification information is not received from their assigned Neutron Readers and may similarly identify any students who are in the classroom that do not match the expected class roster based on the identification information received from their Neutron Readers. Additionally, if a new student has been assigned to a class by a school administrator but is not reflected the class roster stored in the administrator device assigned to that class, the received identification information from a Neutron Reader may be configured to update the class roster in the administrator device, which may eliminate the need for additional administration intervention beyond the initial schedule setup on the Neutron Reader described above with reference to FIG. 7.

Based on the received personal identification information from the Neutron Readers in the classroom, the administrator device may generate a visual roster, such as the visual attendance roster 398 of FIG. 3, to which the instructor may refer, for example, for assistance in learning the students' names, faces, and/or seating assignments. The visual roster may also allow the instructor to view the personal identification information for all of the students in the classroom, and/or to view personal identification information for students one at a time, by row, column, alphabetically, and/or other combinations that may be selected by the instructor.

In addition, the administrator device may be configured to determine tardiness of one or more students by automatically transmitting the identification request at pre-set times, such as both when the bell rings and again n minutes after the bell rings. As such, the administrator device may compare the identification information received when the bell rings with the identification information received n minutes after the bell rings to determine which students are tardy without having to disrupt the flow of class. The number of minutes n may be selected by the school administration or the instructor.

Furthermore, the administrator device may be configured to communicate determined attendance information with one or more other administrator terminals, such as a master administrator terminal in the school's main office. The master administrator terminal may similarly communicate with administrator devices in each of the school's classrooms, and as such, may be immediately updated with the status of all students in all classrooms. This may provide the school's main office with an up-to-the-minute census of all students. The master administrator device may also aggregate and transmit the attendance data for all of the school's classrooms to a government authority and/or other regulatory authority to provide government-mandated attendance statistics for the school.

The administrator device may also be programmed on an individual basis to flag tardiness and/or absence of certain students, such as students who have been tardy and/or absent more than a predetermined number of times during a school year. This flag may result in transmission of a notice to the school's main office, a truancy officer, and/or an e-mail/page to the student's parents. The particular method and recipient of the notice may be selected based on the circumstances surrounding the particular student.

A handheld administrator device may be similarly used to identify students in school who are coming in late, walking the halls, etc., by transmitting identification requests to the Neutron Readers on an ad hoc basis. In particular, the administrator device may be configured to detect one or more Neutron Readers in a given area, and may establish an ad hoc wireless data connection with a selected one of the Neutron Readers using the localized wireless connection protocol to transmit an identification request thereto. In response, the administrator device may receive and display the personal identification information received from the selected Neutron Reader, which may be used to identify the student carrying the Neutron Reader. The identification information may include the name of the student assigned to the Neutron Reader, other identification information for the student (such as Social Security Number), the current school district, a photographic image of the student, the student's current t grade/level in school, the student's class schedule, and/or other data that may be defined by the administrator. For example, the administrator device may display the photo of the student with her name and the class and/or classroom to which she is assigned at the present day and time, so that the administrator would know who the student is and where she is suppose to be at a given time. As such, a school administrator or other user of the administrator device may direct a student to the classroom in which she currently belongs based on the received personal identification information from her assigned Neutron Reader.

In the drawings and specification, there have been disclosed exemplary embodiments of the invention, and although specific terms are used, they are used in a generic and descriptive sense only and not for purposes of limitation, the scope of the invention being defined by the following claims.

That which is claimed:

1. A method of tracking attendance of an event, the method comprising:
   detecting a presence of a mobile attendee device, the mobile attendee device including personal identification information stored therein for an attendee associated-with the mobile attendee device who is registered for the event;

establishing an ad hoc wireless data connection with the mobile attendee device responsive to detecting the presence;

transmitting an identification request to the mobile attendee device via the ad hoc wireless data connection;

receiving the personal identification information for the attendee from the mobile attendee device via the ad hoc wireless data connection;

displaying the personal identification information on an administrator device;

comparing a current location of the mobile attendee device with an expected location for the attendee indicated by the personal identification information; and transmitting a warning signal to the mobile attendee device via the ad hoc wireless data connection when the current location does not match the expected location, wherein the warning signal causes the mobile attendee device to display a warning message on a display thereof.

2. The method of claim 1, wherein the mobile attendee device comprises one of a plurality of mobile attendee devices associated with respective ones of a plurality of attendees and including respective personal identification information, the method further comprising:

detecting respective presences of the plurality of mobile attendee devices, establishing respective ad hoc wireless data connections with the plurality of mobile attendee devices responsive to detecting the respective presences;

transmitting the identification request to the plurality of mobile attendee devices via the respective ad hoc wireless connections; then receiving the respective personal identification information from the plurality of mobile attendee devices for the ones of the plurality of attendees via the respective ad hoc wireless connections;

generating a visual attendance roster based on the respective personal identification information for the plurality of attendees; and displaying the visual attendance roster on the administrator device.

3. The method of claim 2, wherein generating the visual attendance roster comprises:

determining respective relative spatial relationships between the administrator device and the plurality of mobile attendee devices based on respective signals received from the plurality of mobile attendee devices; and generating the visual roster based on the respective spatial relationships.

4. The method of claim 3, wherein determining the respective spatial relationships comprises:

receiving the respective signals from the plurality of mobile attendee devices identifying respective seating positions currently associated with the plurality of mobile attendee devices, wherein the respective seating positions are associated with respective known physical locations in a room.

5. The method of claim 2, further comprising:
comparing the received personal identification information with expected identification information for registered attendees of the event; and determining an absence of a registered attendee based on the comparing.

6. The method of claim 5, further comprising:
transmitting a notification to an electronic device associated with a contact person for the registered attendee responsive to determining the absence.

7. The method of claim 2, wherein the event comprises a class meeting in a school, and further comprising:

forwarding the personal identification information for the plurality of attendees from the administrator device to a master administrator device for the school, wherein the master administrator device is to receive information from a plurality of administrator devices.

8. The method of claim 7, further comprising:
determining, at the master administrator device, a total number of currently present attendees in the school based on the personal identification information from the plurality of administrator devices.

9. The method of claim 2, wherein displaying the visual attendance roster comprises:

selectively displaying a subset of the visual attendance roster comprising personal identification information for ones of the plurality of attendees on the administrator device responsive to selection of the ones of the plurality of attendees from the displayed visual attendance roster.

10. The method of claim 2, wherein the identification request comprises a first identification request, wherein detecting, establishing, transmitting, and receiving are performed at a first time, the method further comprising:

detecting a presence of an additional mobile attendee device at a second time after the first time;

establishing a wireless data connection with the additional mobile attendee device responsive to detecting the presence of the additional mobile attendee device;

transmitting a second identification request to the additional mobile attendee device via the wireless data connection; then receiving personal identification information from the additional mobile attendee device via the wireless data connection; and determining tardy ones of the plurality of attendees based on the personal identification information received in response to the first identification request and the personal identification information received in response to the second identification request.

11. The method of claim 1, wherein the mobile attendee device comprises one of a plurality of mobile attendee devices associated with respective ones of a plurality of attendees who are registered for the event, and further comprising:

detecting respective presences of the plurality of mobile attendee devices; and displaying a listing of the plurality of mobile attendee devices responsive to detecting the respective presences, wherein establishing the ad hoc wireless data connection comprises selectively establishing the ad hoc wireless data connection with one of the plurality of mobile attendee devices responsive to a selection the one of the plurality of mobile attendee devices from the displayed listing.

12. The method of claim 1, further comprising:
receiving the identification request from the administrator device via the ad hoc wireless data connection; and transmitting the personal identification information for the attendee to the administrator device via the ad hoc wireless data connection responsive to receiving the identification request.

13. A computer program product for operating a mobile attendee device associated with an attendee registered for an event, the computer program product comprising a non-transitory computer readable storage medium including computer readable program code embodied therein, the computer readable program code comprising:

computer readable program code to detect a presence of an administrator device associated with the event;

computer readable program code to establish an ad hoc wireless data connection with the administrator device;

computer readable program code to receive an identification request from the administrator device via the ad hoc wireless data connection;

computer readable program code to transmit personal identification information for the attendee to the administrator device via the ad hoc wireless data connection responsive to receiving the identification request, wherein the personal identification information is displayed on the administrator device;

computer readable program code to receive a warning signal from the administrator device via the ad hoc wireless data connection when a current location of the mobile attendee device does not match an expected location for the attendee associated with the mobile attendee device indicated by the personal identification information; and computer readable program code configured to display a warning message on the mobile attendee device responsive to receiving the warning signal.

14. The computer program product of claim 13, further comprising:
computer readable program code to authenticate the administrator device prior to establishing the ad hoc wireless data connection.

15. The computer program product of claim 13, further comprising:
computer readable program code to read a tag associated with a seating position proximate the mobile attendee device; and
computer readable program code to transmit a signal to the administrator device via the ad hoc wireless data connection identifying the seating position,
wherein the seating position is associated with a known physical location in a room.

16. A system for tracking attendance of an event, comprising:

a mobile attendee device including personal identification information stored therein for an attendee associated with the mobile attendee device who is registered for the event; and an administrator device to detect a presence of the mobile attendee device, establish an ad hoc wireless data connection with the mobile attendee device responsive to detection of the presence, transmit an identification request to the mobile attendee device via the ad hoc wireless data connection, receive the personal identification information for the attendee from the mobile attendee device via the ad hoc wireless data connection, display the personal identification information on the administrator device, compare a current location of the mobile attendee device with an expected location for the attendee indicated by the personal identification information, and transmit a warning signal to the mobile attendee device via the ad hoc wireless data connection when the current location does not match the expected location, wherein the warning signal causes the mobile attendee device to display a warning message on a display thereof.

17. The system of claim 16, wherein the mobile attendee device comprises one of a plurality of mobile attendee devices associated with respective ones of a plurality of attendees and including respective personal identification information, and wherein the administrator device is further configured to generate and display a visual attendance roster based on the respective personal identification information for the plurality of attendees.

18. The method of claim 1, wherein the event comprises attendance of a school, and further comprising:
determining that the attendee associated with the mobile attendee device is leaving the event based on the personal identification information stored in the mobile attendee device;
automatically initiating deletion of the personal identification information from the mobile attendee device responsive to determining that the attendee is leaving the event.

* * * * *